(12) United States Patent (10) Patent No.: US 8,800,590 B2
Gilbertson et al. (45) Date of Patent: Aug. 12, 2014

(54) THERMALLY-ACTUATED GAS LIFT SAFETY VALVE

(75) Inventors: Eric Wright Gilbertson, Cambridge, MA (US); Franz Hover, Somerville, MA (US); Eduardo Colina, San Ramon, CA (US); Donald Bryan Freeman, Houston, TX (US)

(73) Assignees: Massachusetts Institute of Technology, Cambridge, MA (US); Chevron U.S.A. Inc., San Ramon, GA (US)

( * ) Notice: Subject to any disclaimer, the term of this patent is extended or adjusted under 35 U.S.C. 154(b) by 555 days.

(21) Appl. No.: 13/075,424

(22) Filed: Mar. 30, 2011

(65) Prior Publication Data

US 2012/0247780 A1 Oct. 4, 2012

(51) Int. Cl.
*F16K 31/00* (2006.01)
*E21B 21/10* (2006.01)
*E21B 43/12* (2006.01)

(52) U.S. Cl.
USPC ............. 137/155; 166/373; 166/386; 251/11; 251/129.06

(58) Field of Classification Search
CPC ....... E21B 43/123; E21B 34/06; E21B 21/10; E21B 2034/002; F23N 3/047; F16K 31/002
USPC .......... 137/155; 166/319, 325, 372, 373, 386; 251/11, 129.06, 315.01
See application file for complete search history.

(56) References Cited

U.S. PATENT DOCUMENTS

| | | | | |
|---|---|---|---|---|
| 4,284,235 A | * | 8/1981 | Diermayer et al. | ............ 236/1 G |
| 4,569,206 A | * | 2/1986 | Mitani et al. | ...................... 62/156 |
| 4,884,780 A | * | 12/1989 | Ohashi | ............................. 251/11 |
| 4,979,672 A | * | 12/1990 | AbuJudom et al. | ......... 236/68 B |
| 5,071,064 A | * | 12/1991 | AbuJudom et al. | ............ 236/1 G |
| 7,182,101 B2 | * | 2/2007 | Alacqua et al. | ................ 137/875 |
| 2009/0139727 A1 | | 6/2009 | Tanju et al. | |
| 2009/0151924 A1 | | 6/2009 | Lake | |
| 2010/0108324 A1 | | 5/2010 | Tanju | |
| 2013/0146155 A1 | * | 6/2013 | Gilbertson et al. | ............ 137/468 |

OTHER PUBLICATIONS

Eric Gilbertson et al., "Failure Mode and Sensitivity Analysis of Gas Lift Valves," Proceedings of the 29th International Conference on Ocean, Offshore, and Arctic Engineering, OMAE2010-20343, Jun. 6-11, 2010, Shanghai, China, pp. 1-10.
"Gas lift," Wikipedia, http://en.wikipedia.org/wiki/Gas_lift, Jan. 24, 2011, 2 pgs.
International Search Report and Written Opinion dated Oct. 25, 2012, issued in the corresponding PCT Application No. PCT/US2012/030742, 13 pages.

* cited by examiner

*Primary Examiner* — Craig Schneider
(74) *Attorney, Agent, or Firm* — Gesmer Updegrove LLP (57) ABSTRACT

In one embodiment, a valve comprising a valve body; an orifice disposed within the valve body; a fluid flow restraining member located at a first location of the orifice, the fluid flow restraining member pivotable between a closed position and an open position; an extending member connected to, and moveable in pivotable synchronization with, the fluid flow restraining member; and a shape memory alloy element attached to the extending member and the valve body, the shape memory alloy element causing a pivotal movement of the extending member between positions corresponding to the open and closed positions responsive to a change in temperature of the shape memory alloy element.

15 Claims, 9 Drawing Sheets

THERMALLY-ACTUATED GAS LIFT SAFETY VALVE

CROSS-REFERENCE TO RELATED APPLICATIONS

NONE

TECHNICAL FIELD

This disclosure relates in general to gas lift apparatuses and methods.

BACKGROUND

Gas lift is an artificial lifting method used to produce oil from wells that do not flow naturally. In gas-lifted wells, gas is injected through the well annulus and into the well tubing at a down-well location. The gas mixes with the oil in the tubing, aerating the oil and causing it to rise to the surface.

To pass through the annulus to the tubing, the injection gas flows through a valve commonly referred to as a gas lift valve. Gas lift valves comprise one-way valves that allow gas to pass from the annulus to the tubing yet prevents oil from passing from the tubing to the annulus. Many gas lift valves comprise a pressurized bellows valve and an internal check valve. The bellows valve opens when the injection gas is pressurized above a threshold value, and the internal check valve is used to prevent oil from passing through the gas valve from the tubing and into the annulus.

A gas lift valve can fail if it allows oil passage from the tubing to the annulus. For failure to occur, at least two conditions are simultaneously met: (1) the reverse-flow check valve has a leak and the tubing pressure exceeds the gas pressure; and (2) a combination of high tubing pressure and low gas pressure allows the bellows valve to open. Further, if both the check valve and the bellows valve leak, then backflow can occur any time the tubing pressure exceeds the annulus pressure. The proper function of gas lift valves is very important for the safety of the well and surface operations. For instance, if hydrocarbons improperly flow through the annulus and reach the wellhead, an undesired accumulation of high-pressure combustible material may occur at the well and surface and hence may increase the risk of injury to personnel and/or damage to equipment, as well as disruptions in operation.

SUMMARY

In one embodiment, a valve comprising a valve body; an orifice disposed within the valve body; a fluid flow restraining member located at a first location of the orifice, the fluid flow restraining member pivotable between a closed position and an open position; an extending member connected to, and moveable in pivotable synchronization with, the fluid flow restraining member; and a shape memory alloy element attached to the extending member and the valve body, the shape memory alloy element causing a pivotal movement of the extending member between positions corresponding to the open and closed positions responsive to a change in temperature of the shape memory alloy element.

BRIEF DESCRIPTION OF THE DRAWINGS

The systems and methods described herein can be better understood with reference to the following drawings. The components in the drawings are not necessarily drawn to scale, emphasis instead being placed upon clearly illustrating the principles of the present disclosure. In the drawings, like reference numerals designate corresponding parts throughout the several views.

DETAILED DESCRIPTION

Disclosed herein are certain embodiments of a thermally-actuated gas lift safety valve and methods of using the valve, such as in a gas-lifted oil well environment. In one embodiment, the thermally-actuated gas lift safety valve comprises a ball valve and extending members that are operatively coupled to shape memory alloy elements, enabling the valve to close when heated past a defined high transition temperature and open when cooled below a defined low transition temperature. When the ball valve/extending members/shape memory alloy assembly is used in combination with an integrated check valve, certain embodiments of the thermally-actuated gas lift safety valve address one or more of the issues described in the background of the present disclosure and hence enhance the safety of gas-lifted oil wells by preventing oil from reaching the surface through the annulus in the event of check valve failure.

These advantages and/or features, among others, are described hereinafter in the context of a gas-lifted oil well environment, with the understanding that other applications and/or environments where unsatisfactory consequences of failure of a downstream check valve (integrated or otherwise) may be ameliorated or eliminated using the embodiments described herein. Further, it should be understood by one having ordinary skill in the art that, though specifics for one or more embodiments are disclosed herein, such specifics as described are not necessarily part of every embodiment.

Figure 1:
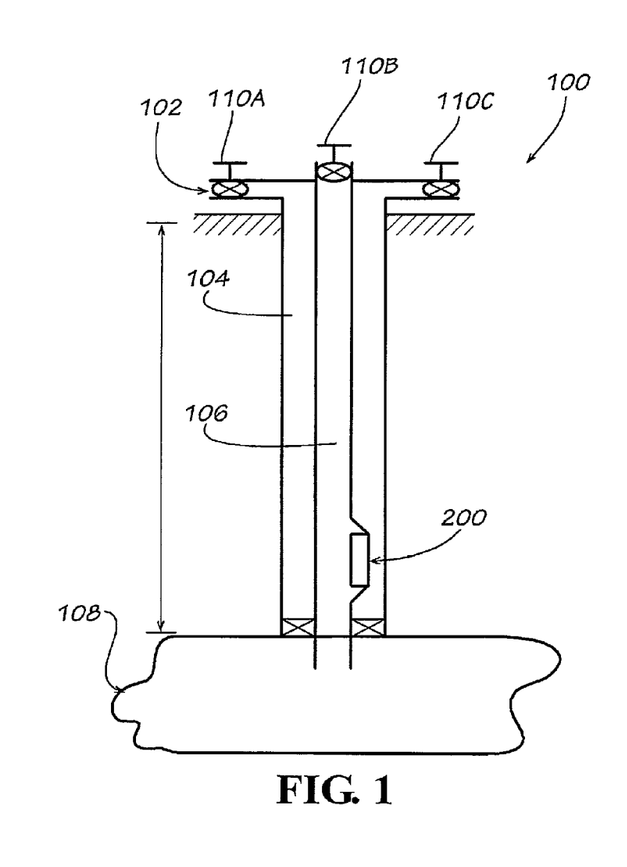
FIG. 1 is a schematic diagram of an example environment in which an embodiment of a thermally-actuated gas lift safety valve may be implemented.

Attention is directed to FIG. 1, which is an example environment in which embodiments of a thermally-actuated gas lift safety valve may be implemented. In particular, FIG. 1 depicts a gas-lifted oil well 100 in which a thermally-actuated gas lift safety valve 200 may be used. It should be understood by one having ordinary skill in the art, in the context of the present disclosure, that the gas-lifted oil well 100 shown in FIG. 1 is merely illustrative, and should not be construed as implying any limitations upon the scope of the disclosure. The gas-lifted oil well 100 comprises a piping infrastructure 102 located both partially above and beneath (e.g., extending 5 km beneath, though not limited to such applications) the sea floor (the latter indicated by diagonal lines in FIG. 1). The piping infrastructure 102 comprises an annulus 104 surrounding tubing 106, the tubing extending into a reservoir 108 of crude oil. Proximal to the sea floor surface are safety valves (e.g., flapper valves) 110A and 110C (restricting fluid flow through the annulus 104) and safety valve (e.g., flapper valve) 110B (restricting fluid flow through the tubing 106). Though described using flapper valves 110A, 110B, and 110C, other valves with similar functionality may be used as is known in the art. The thermally-actuated gas lift safety valve 200 enables gas to be injected from the annulus 104 to the tubing 106 to aerate the oil sourced from the reservoir 108, while preventing the ingress of the oil as it flows via aeration through the tubing 106 and to the annulus 104.

Figure 2:
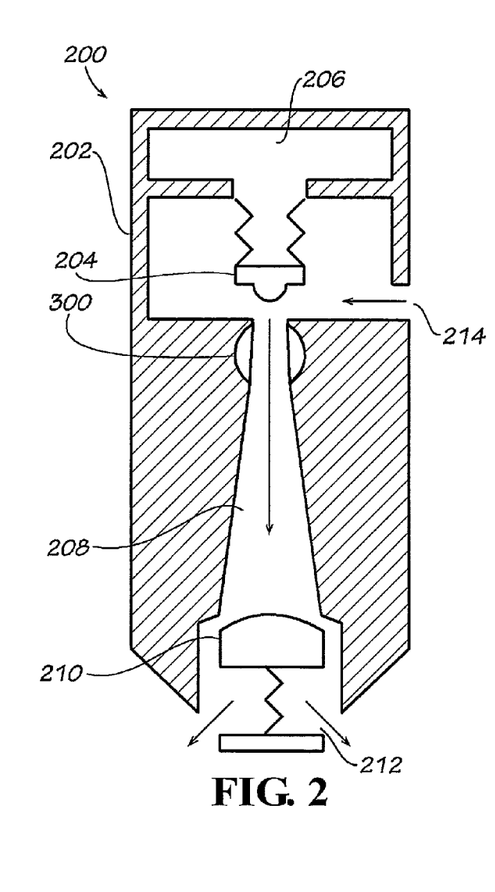
FIG. 2 is a schematic diagram that generally depicts an embodiment of a thermally-actuated gas lift safety valve.

Referring now to FIG. 2, an embodiment of the thermally-actuated gas lift safety valve 200 is shown in schematic, generalized (partially cut-away, upright position) form. It should be understood by one having ordinary skill in the art, in the context of the present disclosure, that the thermally-actuated gas lift safety valve 200 shown in FIG. 2 is merely illustrative, and should not be construed as implying any limitations upon the scope of the disclosure. The thermally-actuated gas lift safety valve 200 comprises a valve body 202 suitably constructed with a material to withstand sub-sea surface pressure and/or temperatures (e.g., well temperatures may range from 20° C. to 70° C.). Enclosed within one end (proximal to the annulus 104, or as depicted in FIG. 2, the topmost position) of the valve body 202 is a bellows valve 204, depicted in FIG. 2 with a bellows chamber 206 for containing a suitable pressurized gas, such as nitrogen gas, among others. It should be understood that other configurations for a bellows valve 204 may be used in some embodiments, including those that use a spring with a charged bellows assist, among others well-known to those having ordinary skill in the art. Adjacent to (e.g., immediately beneath) the bellows valve 204 is a fluid flow restraining member assembly 300, which in one embodiment comprises a ball valve, stem, and extending member(s) as explained further below. The fluid flow restraining member assembly 300 resides adjacent the bellows valve 204 and proximal to a gas inlet end of an orifice 208, which in one embodiment is configured as a Venturi orifice. In some embodiments, the orifice 208 may be configured according to a different structure, such as a square-edged orifice. Proximal to the opposite end of the orifice 208 is a check valve 210, which allows fluid flow to be discharged from an outlet 212 of the thermally-actuated gas lift safety valve 200 while inhibiting flow in the reverse direction (e.g., toward the fluid flow restraining member assembly 300). In some embodiments, the check valve 210 may be implemented as an apparatus separate from the thermally-actuated gas lift safety valve 200, yet used in combination.

In an example aeration operation, as depicted in FIG. 2 by the use of arrows (with continued reference to FIG. 1), flow of gas to aerate the oil of the reservoir 108 proceeds from the annulus 104 to an inlet of the thermally-actuated gas lift safety valve 200. Upon the pressure of the gas from the annulus 104 overcoming the pressurized gas of the bellows valve 204, the bellows valve 204 opens and the gas flows through the opened ball valve of the fluid flow restraining member assembly 300, through the orifice 208, and past the check valve 210 and outlet 212 and into the tubing 106.

Figure 3A:
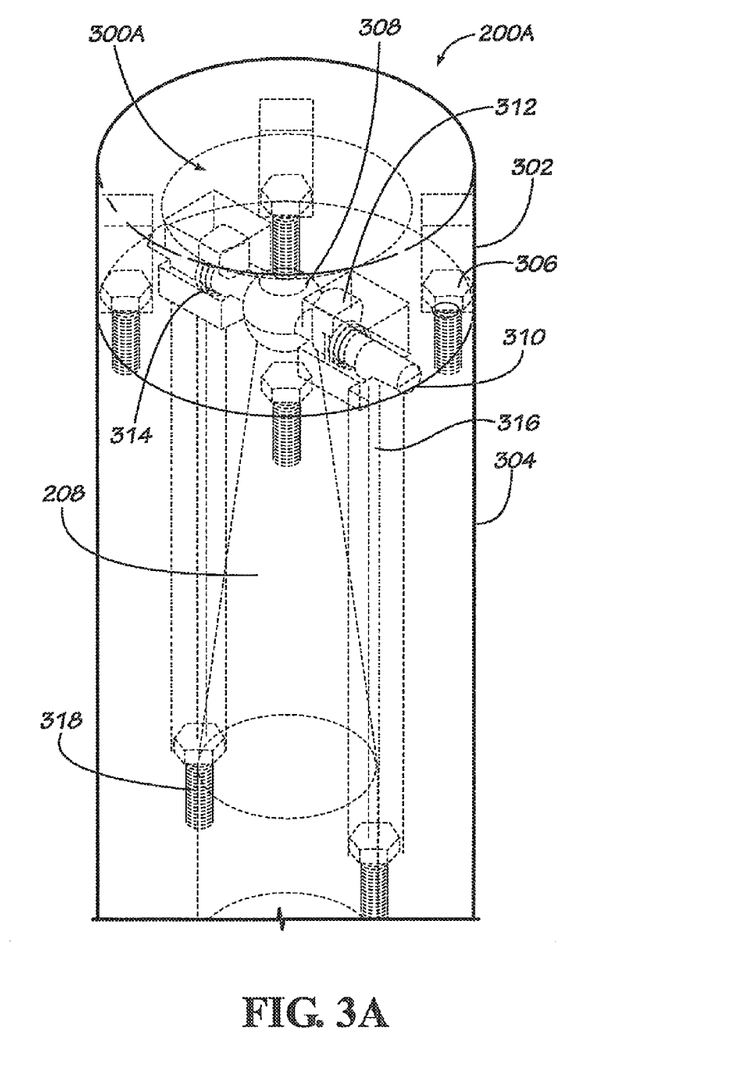
FIGS. 3A and 3B are partial perspective views of an embodiment of a thermally-actuated gas lift safety valve.
Figure 3B:
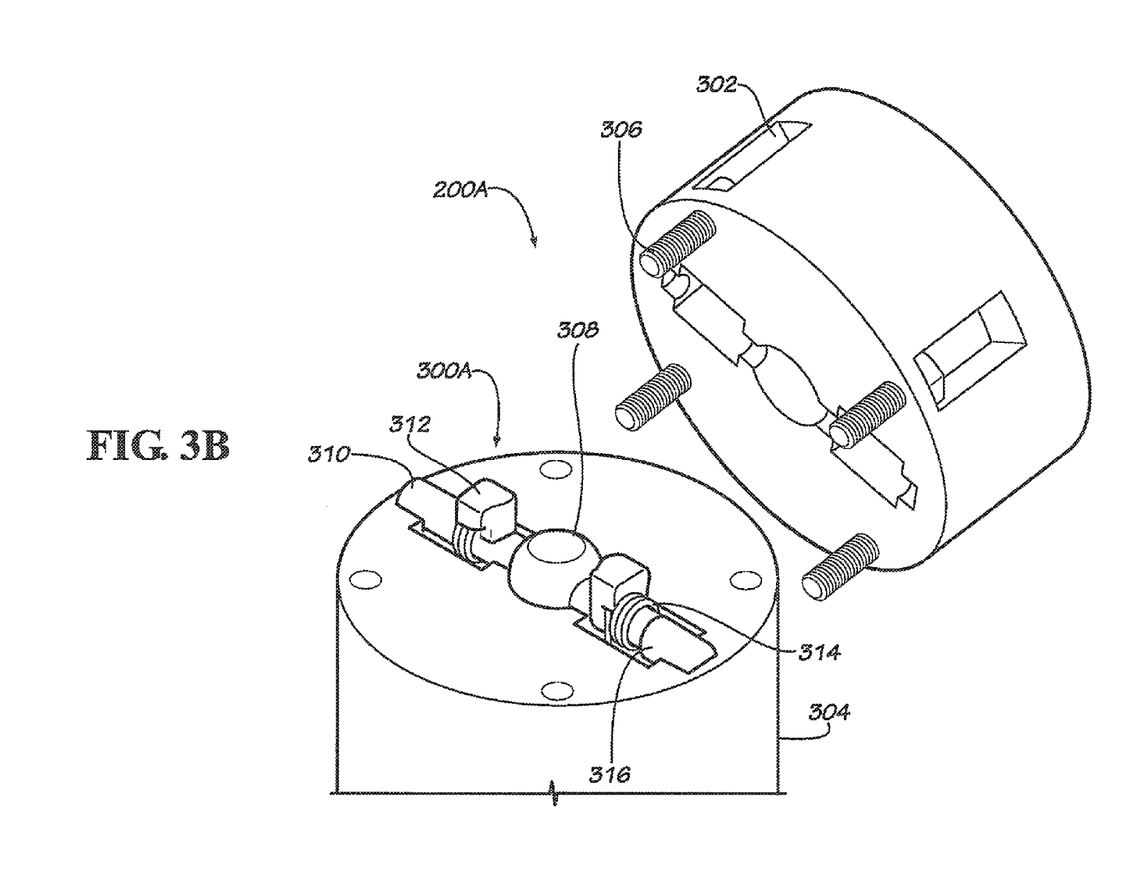

FIGS. 3A and 3B illustrate perspective views of an embodiment of the thermally-actuated gas lift safety valve 200, depicted in FIGS. 3A-3B with reference numeral 200A. It should be understood by one having ordinary skill in the art, in the context of the present disclosure, that the thermally-actuated gas lift safety valve 200A shown in FIGS. 3A-3B is merely illustrative, and should not be construed as implying any limitations upon the scope of the disclosure. In one embodiment, the thermally-actuated gas lift safety valve 200A is comprised of a first valve body or housing portion 302 closest to the annulus end and a second valve body or housing portion 304 that extends (as shown in the figure) downward toward the tubing end. The first valve body portion 302 is secured (e.g., detachably secured) to the second valve body portion 304 by one or more attachment members, such as attachment member 306 (e.g., embodied as bolts (four of them) as shown in FIGS. 3A and 3B, though different quantities and/or other detachably securing mechanisms may be used in some embodiments). The attachment members 306 may be accessed through slots located on the sides of the first valve body portion 302 and proximal to each attachment member 306, or in some embodiments, from slots or access points in other locations.

The thermally-actuated gas lift safety valve 200A further comprises the fluid flow restraining member assembly 300A, as more clearly detailed in FIGS. 3A-4A, and which includes a fluid flow restraining member 308 (e.g., also referred to hereinafter as a ball valve, though other types of flow restraining components may be used, such as globe valves, paddle valves, etc. may be used in some embodiments). The ball valve 308 sits in an at least partially spherical pocket within the valve bodies 302 and 304. The ball valve 308 is connected to extending members 310 on opposing sides of the ball valve 308. In one embodiment, the extending members 310 are contiguously cylindrical in shape, though not limited to such a geometry (e.g., edged and/or non-uniform geometries are also contemplated in some embodiments). Further, though two extending members 310 are shown extending from opposing sides of the ball valve 308, in some embodiments, a single extending member 310 may be used. The ball valve 308 and the extending members 310 may comprise a single machined or cast assembly in some embodiments, or be fabricated as distinct parts that are welded together in some embodiments. In either of these cases, the ball valve 308 and extending members 310 rotate coincidentally about an axis parallel to and running through the extending members 310.

Coincident rotation of the ball valve 308 and extending members 310 comprises a ninety-degree (90°) movement between fully-open (e.g., vertical, enabling fluid flow) and fully closed (e.g., horizontal, preventing fluid flow). The extending members 310 are restricted from further movement (e.g., beyond the zero-to-90° range) by stoppers 312 connected to each extending member 310 and located proximal to the ball valve 308. Note that other mechanisms may be used in some embodiments to constrain movement between the opened and closed positions. Radially encompassing at least a portion of each of the extending members 310 and braced against (e.g., in some embodiments, affixed to), and proximal to, each stopper 312, is a force assist member 314, which in one embodiment is a spring (e.g., torsion spring), though other similar mechanical mechanisms may be used in some embodiments. Further, one or more shape memory alloy elements 316 (e.g., wires) are connected (e.g., affixed, such as tied) to each of the extending members 310. In some embodiments, one or more shape memory alloy elements 316 are only attached to a single extending member 310. The opposite end of each of the shape memory alloy elements 316 extends, and is attached (e.g., via attachment members 318, such as a bolt), to a respective location of the lower valve body portion 304. Note that the lower portion of the lower valve body portion 304 including the check valve 210 is not shown, as it includes well-known check valve and outlet features.

In operation, briefly, the extending members 310 (and hence the ball valve 308) are rotated through actuation of the shape memory alloy elements 316, which contract when heated and expand when cooled. The force assist members 314 apply a valve opening force at a time corresponding to when the shape memory alloy elements 316 expand. The source of the heating and cooling, and operation in the context of the environment of the thermally-actuated gas lift safety valve 200A, is explained further below.

Figure 4A:
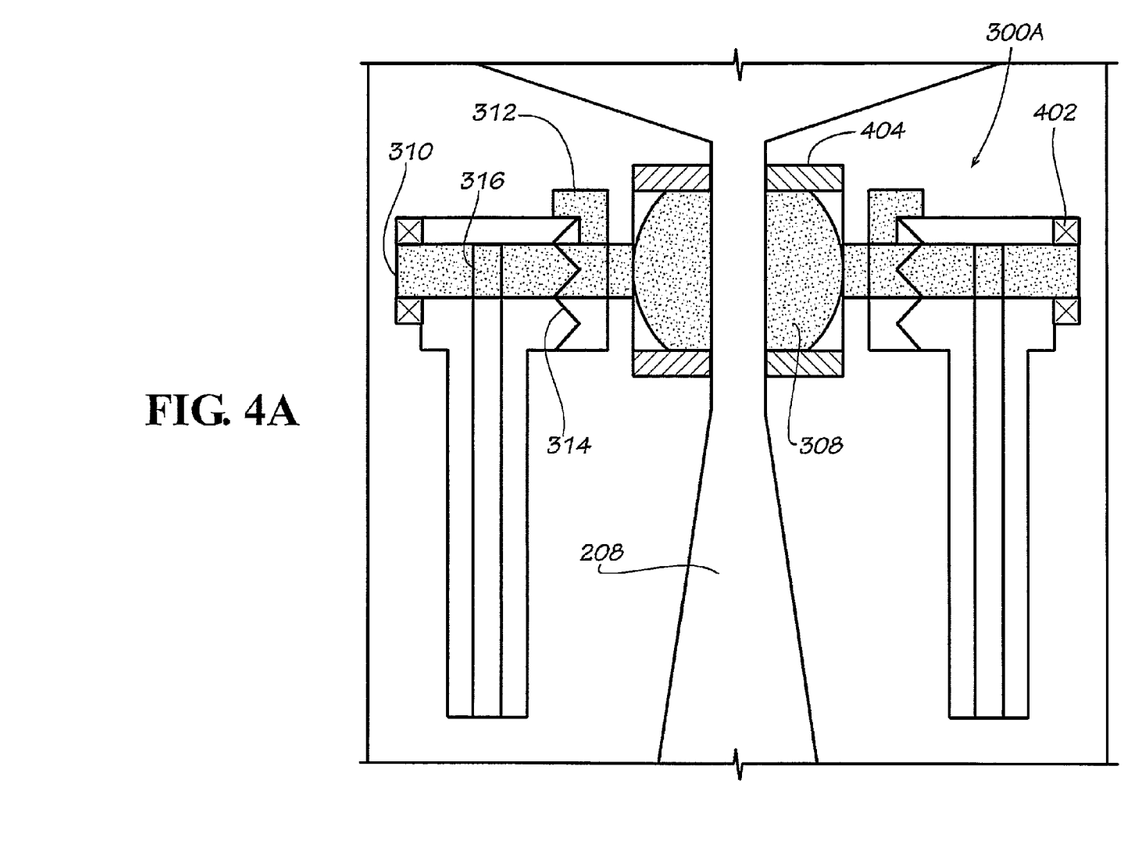
FIG. 4A is a schematic diagram that shows a partial cutaway, side elevation view of an embodiment of a thermally-actuated gas lift safety valve.
Figure 4B:
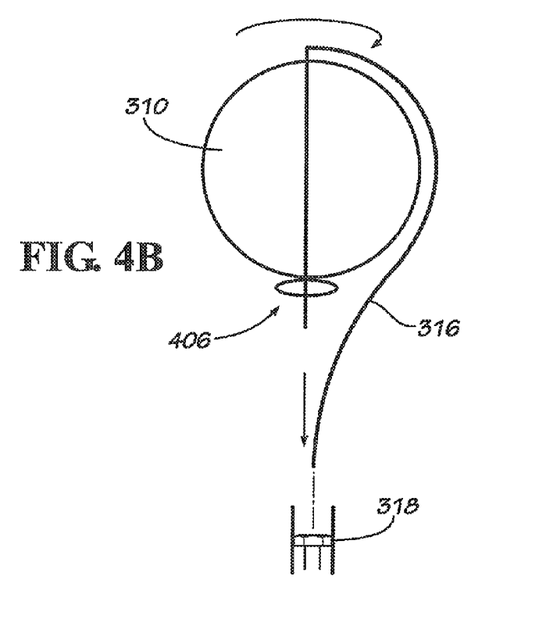
FIG. 4B is a schematic diagram that shows a portion of the extending member and how a shape memory alloy element attaches to the extending member in one embodiment of a thermally-actuated gas lift safety valve.

Referring to FIGS. 4A and 4B, shown are more detailed, partial cut-away (e.g., side elevation) schematic views of select portions of the thermally-actuated gas lift safety valve 200A, and in particular, an embodiment of the fluid flow restraining member assembly 300 (depicted in FIGS. 4A-4B with reference numeral 300A) situated between the bottom of the bellows valve 204 and proximal to the one end of the orifice 208. Similar to the description set forth in association with FIGS. 3A and 3B above, the fluid flow restraining member assembly 300A comprises the ball valve 308 and extending members 310 extending in one embodiment from opposing sides of the ball valve 308. Each extending member 310 is connected to a stopper 312 located proximally to the ball valve 308, the former which serves to constrain rotation of the fluid flow restraining member assembly 300A. A force assist member (e.g., spring) 314 is radially wound about at least a portion of each extending member 310. Shape memory alloy elements 316 are attached to each extending member 310 to enable rotation actuation. The respective extending members 310 further comprise lubricated joint bearings 402 at each end (end opposite the end adjacent to the stopper 312) for valve rotation. Sealing members 404 create a water-tight seal at the ball valve openings. Sealing members 404 may be embodied as elastomeric O-rings, or in some embodiments, other types of well-known water-tight sealing material such as packing, etc.

FIG. 4B shows another side schematic view of one of the extending members 310 (e.g., looking along the longitudinal axis of the extending member 310), and in particular, depicts one method of attaching each of the shape memory alloy elements 316 to the extending member 310. In particular, the shape memory alloy element 316 shown in FIG. 4B is tied (e.g., by knot 406, though other mechanisms of affixing the element 316 to the member 310 are contemplated) to the extending member 310, wrapped one-half revolution around the member 310, and attached to the body beneath (when viewed from a vertical orientation) the member 310 via attachment member 318 as explained above. It should be appreciated that other methods of attachment may be applied in some embodiments.

Figure 5:
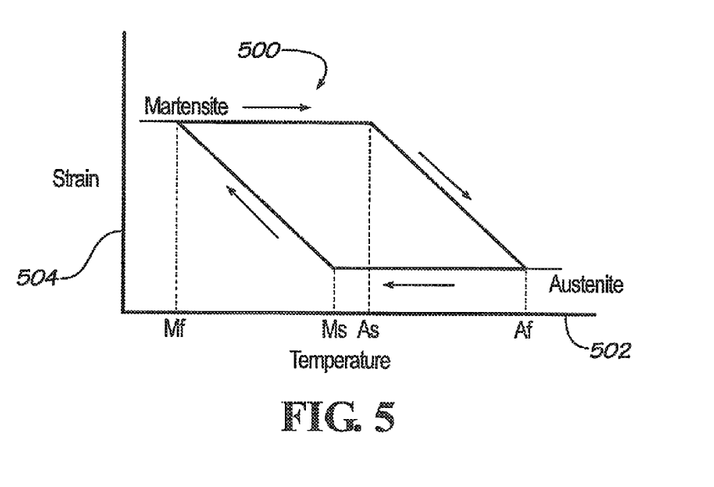
FIG. 5 is a hysteresis diagram that illustrates an example operation of the shape memory alloy element of an embodiment of a thermally-actuated gas lift safety valve.

An understanding of an example operation of the thermally-actuated gas lift safety valve 200A may be better facilitated through use of a strain versus temperature, hysteresis diagram 500, as shown in FIG. 5. The diagram 500 comprises a horizontal axis 502 corresponding to temperature, and a vertical axis 504 corresponding to strain. In general, shape memory alloys are alloys that undergo a solid state phase change between a Martensitic low-temperature state and an Austenitic high-temperature state when heated or cooled. These types of alloys are said to have "memory" because they return to the same low-temperature shape whenever cooled to the Martensitic state and to the same high-temperature shape when heated to the Austenitic state. As illustrated in FIG. 5, shape memory alloys do not have a single transition temperature between Martensite and Austenite, but instead undergo a hysteresis, with different transition temperatures depending on whether the alloy is being cooled or heated. Referring to FIG. 5, when the alloy is being heated, $A_s$ represents the start of the transition from Martensite to Austenite and $A_f$ represents the final transition to Austenite. When being cooled, $M_s$ represents the start of the transition from Austenite to Martensite and $M_f$ represents the final transition to Martensite. Based on the alloy proportion, a shape memory alloy may have transition temperatures within the range of −150° C. to +800° C. It should be understood in the context of the present disclosure that transition temperatures of the shape memory alloy elements 316 may be "tuned" to match any or substantially any given well conditions (e.g., manufacturers may alter the alloy composition to achieve different transition temperatures).

Figure 6A:
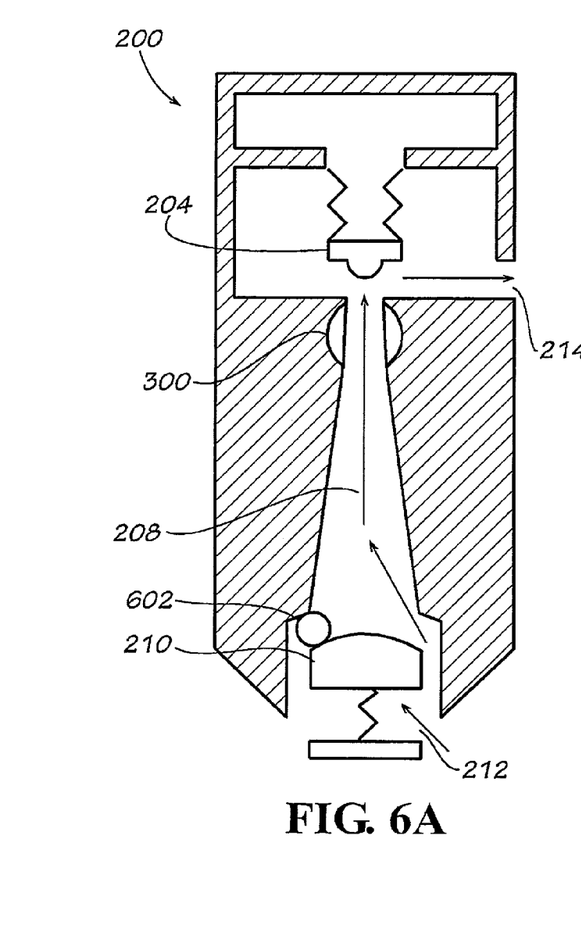
FIGS. 6A-6B are schematic diagrams that illustrate an example operation of an embodiment of a thermally-actuated gas lift safety valve when debris hinders proper operation of a check valve integrated into the thermally-actuated gas lift safety valve.
Figure 6B:
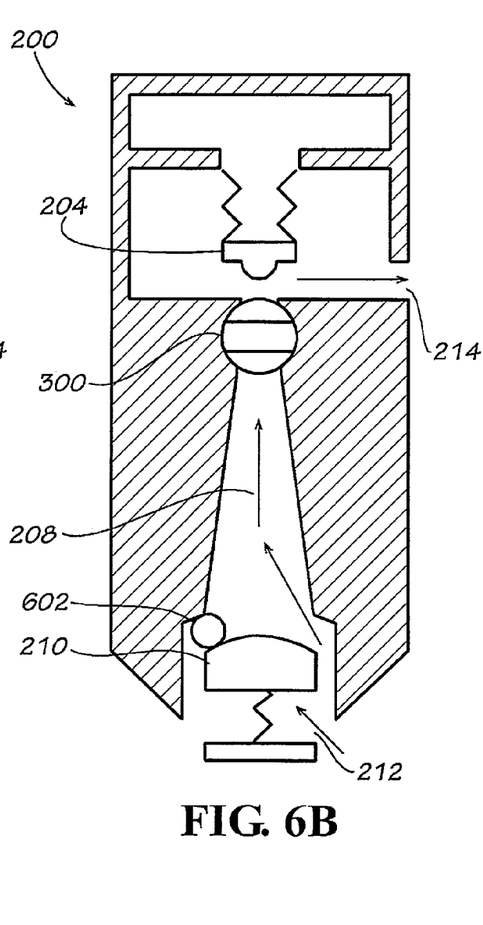

Referring now to FIGS. 6A-6B, and with continued reference to the diagram 500 of FIG. 5, an example failure-mode operation of the thermally-actuated gas lift safety valve 200 (which includes embodiment 200A) is described in the context of a gas-lifted oil well environment. It is noted that the thermally-actuated gas lift safety valve 200 shown in FIGS. 6A-6B is the same as, or similar to, the thermally-actuated gas lift safety valve 200 shown in FIG. 2, with the addition of debris 602 trapped between the check valve 210 and an interior surface of the orifice 208. In general, the thermally-actuated gas lift safety valve 200 relies on the temperature difference between the injected gas in the annulus 104 and the oil in the tubing 106. When the gas is injected through the thermally-actuated gas lift safety valve 200, the valve 200 is cooler than during a backflow situation. Thus, in a backflow situation, the thermally-actuated gas lift safety valve 200 heats up and the ball valve 308 closes. More particularly, the shape memory alloy element 316 is set to have a transition temperature $A_s$ just above the injected gas temperature and an $A_f$ value just below the oil temperature. The $M_s$ and $M_f$ transition temperature values are set to values between the oil temperature and the coldest temperature attainable in the valve-cooling scenario. In some embodiments, the high transition temperature may be at least 15° C. greater than the low transition temperature.

The failure conditions depicted in FIG. 6A comprise the presence of debris 602 trapped in the check valve 210 (though other mechanisms of failure that halt proper movement of the check valve are contemplated), and the annulus pressure required to open the bellows valve 204 ($P_{open}$) being less than the actual pressure in the annulus 104 ($P_{ann}$), which is less than the pressure in the tubing 106 ($P_{tube}$). In other words, $P_{open} < P_{ann} < P_{tube}$. Under these conditions, oil flows improperly (as indicated by the single-headed arrows in FIGS. 6A-6B) through the outlet 212 into the orifice 208, through the opened ball valve 308 and opened bellows valve 204 and through the inlet 214 into the annulus 104. As the oil begins passing through the thermally-actuated gas lift safety valve 200, the entire thermally-actuated gas lift safety valve 200 heats up, in turn heating up the shape memory alloy elements 316 (e.g., by conduction of the heat through the body or housing of the thermally-actuated gas lift safety valve 200) to the oil reservoir temperature. Further, the absence of the cooler injection gas together with the heat conduction affects the shape memory alloy elements 316. In other words, the shape memory alloy elements 316 contract as they heat up past $A_s$ and $A_f$, and thus pull the ball valve 308 (through actuation upon the extending members 310) into a closed (e.g., horizontal) position, as indicated in FIG. 6B.

If the shape memory alloy elements 316 cool and transition to the Martensite state, the shape memory alloy elements 316 expand and the force assist members 314 pull the ball valve 308 back into the open position. In other words, the force assist members 314 assist in restoring the ball valve 308 to the open position.

Having described various features of certain embodiments of a thermally-actuated gas lift safety valve 200, attention is directed to FIGS. 7A-7F (which, as shown, share similar components to those described in FIG. 2 and hence discussion of the same is omitted for brevity except as noted below), which illustrate an example unloading operation during well start-up using a thermally-actuated gas lift safety valve 200. Digressing briefly, in conventional unloading operations, a gas-lifted oil well comprises several conventional gas lift valves along the length of the well for use in unloading, with typically only one gas lift valve used in production (usually the lowest valve).

Figure 7A:
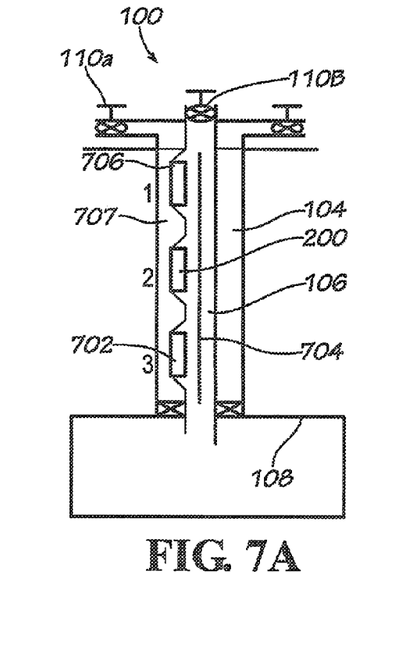
FIGS. 7A-7F are schematic diagrams that illustrate an example unloading procedure that uses an embodiment of a thermally-actuated gas lift safety valve.

In contrast, and referring to FIG. 7A, one unloading method embodiment comprises at least the following changes to conventional operations: (1) only the gas lift valve intended to pass gas during well production contains the thermally-actuated gas lift safety valve 200; and (2) the thermally-actuated gas lift safety valve 200 is positioned as the second-lowest (e.g., in some embodiments, approximately 15 meters above the bottom valve 702) gas lift valve in the well 100 and further has a bellows pressurized to a pressure lower than both the bellows of the gas lift valve 702 at the bottom of the tubing 106 and the gas lift valve 706 located above the thermally-actuated gas lift safety valve 200. Before unloading begins, the thermally-actuated gas lift safety valve 200 is at the steady-state temperature (e.g., relatively hot, and hence the ball valve 308 is closed) of the stagnant oil 704 in the tubing 106, the valve 110B (e.g., safety flapper valve) in the tubing 106 is closed, the annulus 104 is filled with a "kill fluid" 707, and all of the normal (conventional) gas lift valves 702 and 706 are open. Normal unloading procedures are followed until only the lowest gas lift valve 702 is passing gas. The normal unloading process is unaffected by the thermally-actuated gas lift safety valve 200 at this point because the thermally-actuated ball valve 308 is closed and thus valve 200 cannot pass gas.

Figure 7B:
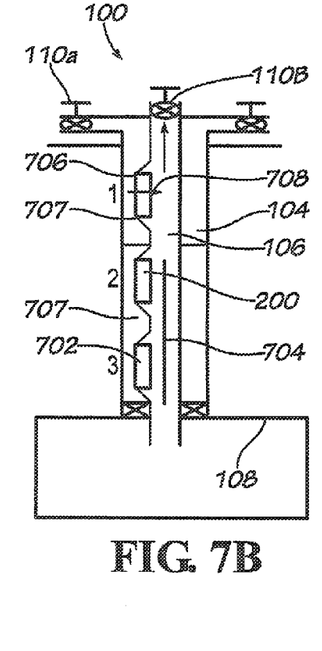

Referring to FIG. 7B, the safety valve 110A is opened and cool gas passes through the annulus 104. The injected gas pressure is increased until the kill fluid 707 is pushed through the gas lift valve 706 and the gas lift valve 706 begins passing the injected gas 708.

Figure 7C:
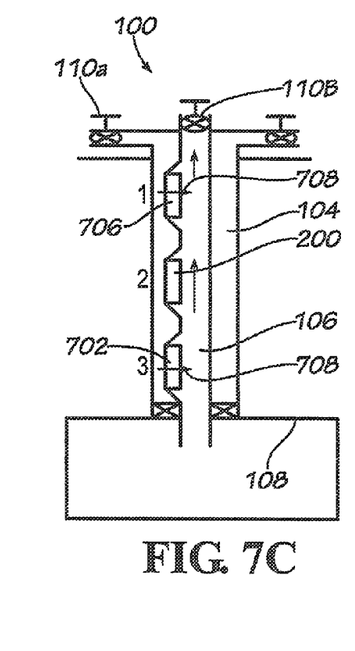

In FIG. 7C, the tubing pressure decreases after the gas lift valve 706 begins passing gas 708. This condition causes the annulus fluid (kill fluid 707) level to drop below the gas lift valve 702, enabling the gas lift valves 702 and 706 to pass gas 708.

Figure 7D:
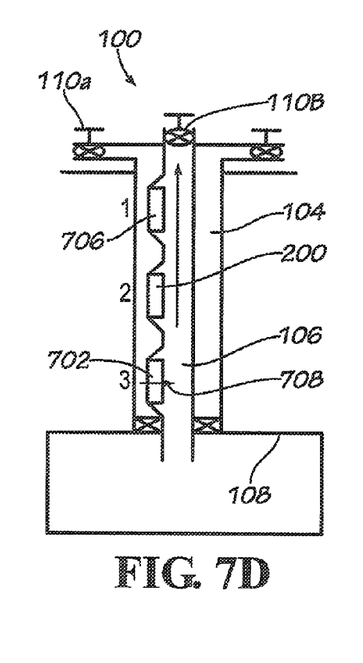

In FIGS. 7C-7D, the annulus pressure decreases with the two gas lift valves 702 and 706 open. The gas lift valve 706 closes shortly after the gas lift valve 702 opens, as shown in FIG. 7D.

Figure 7E:
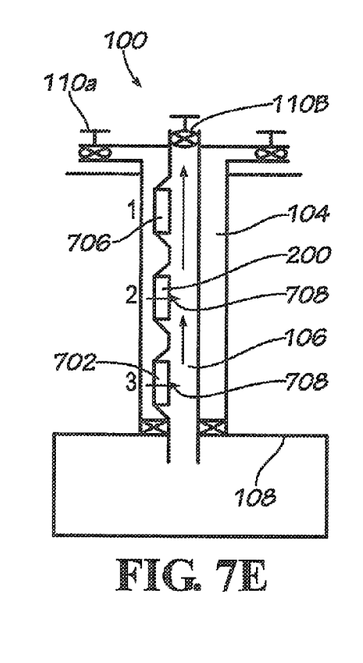
Figure 7F:
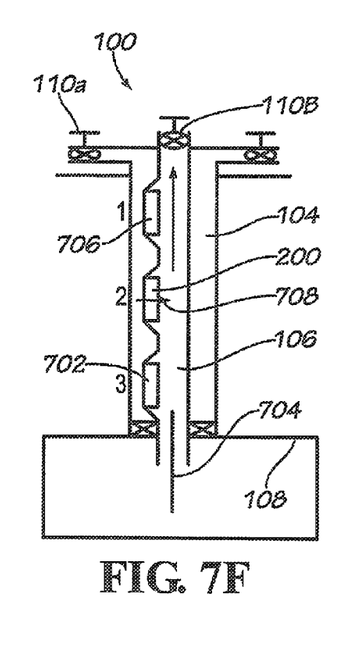

The thermally-actuated gas lift safety valve 200 is gradually cooled (e.g., via convection) by the combination of cool gas 708 passing through the annulus 104 and the gas 708 passing up the tubing 106 (e.g., because the safety valve 110B in the tubing 106 is closed, preventing oil from coming up the tubing 106 from the reservoir 108) from the gas lift valve 702. In other words, the functioning of the gas lift valve 702 acts to cool the thermally-actuated gas lift safety valve 200 through passage of the injected gas 708. Further, the safety valve 110B is closed for the duration of the unloading process to allow better convective cooling of the thermally-actuated gas lift safety valve 200. When the thermally-actuated gas lift safety valve 200 cools below the lower transition temperature (e.g., cools sufficiently below the Martensitic transition temperatures $M_s$ and $M_f$), it opens as illustrated in FIG. 7E, resulting in the bottom two valves—the gas lift valve 702 and the thermally-actuated gas lift safety valve 200—both passing gas 708. In other words, gas 708 now flows through a larger total area (the two bottom valves 702 and 200). This condition leads to a pressure drop in the annulus 104, causing the bellows valve in the lower gas lift valve 702 to close, resulting in only the thermally-actuated gas lift safety valve 200 passing gas 708, as illustrated in FIG. 7F. It is noted that the bellows of the thermally-actuated gas lift safety valve 200 is pressurized to a lower pressure than the bellows of the bottom gas lift valve 702 and thus stays open passing gas 708. At this point, the safety valve 110B in the tubing 106 is opened (e.g., either computer-controlled and/or through associated sensing equipment with a direct controller) and normal oil production continues as the oil 704 flows up from the reservoir 108.

If the check valve 210 of the thermally-actuated gas lift safety valve 200 leaks and allows oil to pass through to the annulus 104, the shape memory alloy elements of the thermally-actuated gas lift safety valve 200 heat up, closing the ball valve 308.

Further, if the well 100 needs shut-in, the thermally-actuated gas lift safety valve 200 closes. In other words, during shut-in, when the flow of injected gas 708 into the annulus 104 is stopped, the thermally-actuated gas lift safety valve 200 heats up or cools down to a steady-state temperature dependent on the oil temperature and ground temperature. If the thermally-actuated gas lift safety valve 200 heats up to a temperature greater than the transition temperature of the thermally-actuated gas lift safety valve 200, the ball valve 308 closes. After shut-in, the operational procedures described above are followed to restart the well 100.

Figure 8:
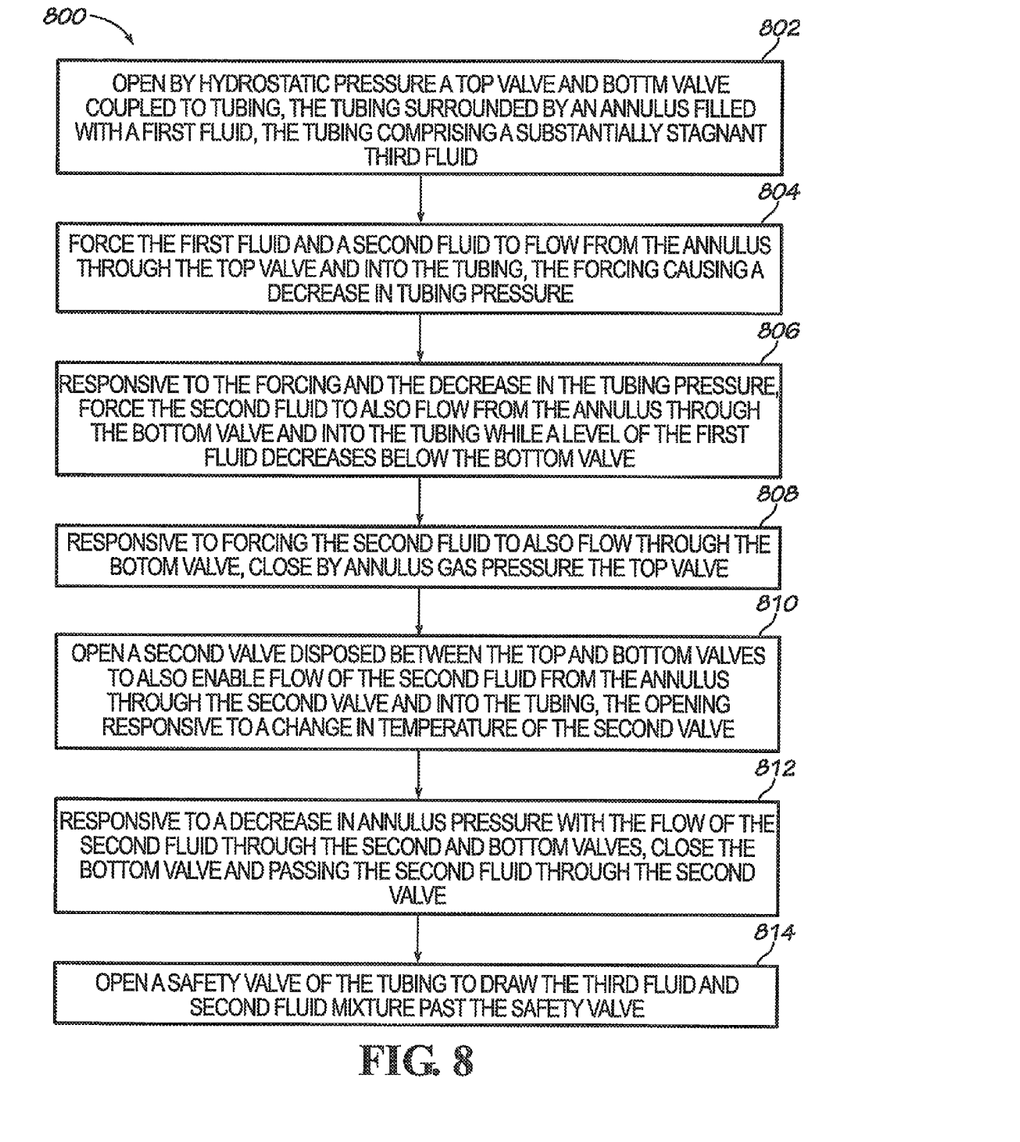
FIG. 8 is an example embodiment of a method that uses the thermally-actuated gas lift safety valve in an unloading procedure.

Having described and illustrated an example unloading procedure that includes the thermally-actuated gas lift safety valve 200, it should be appreciated that one unloading method 800, illustrated in FIG. 8, comprises opening by hydrostatic pressure a top valve and bottom valve coupled to tubing, the tubing surrounded by an annulus filled with a first fluid, the tubing comprising a substantially stagnant third fluid (802); forcing the first fluid and a second fluid to flow from the annulus through the top valve and into the tubing, the forcing causing a decrease in tubing pressure (804); responsive to the forcing and the decrease in the tubing pressure, forcing the second fluid to also flow from the annulus through the bottom valve and into the tubing while a level of the first fluid decreases below the bottom valve (806); responsive to forcing the second fluid to also flow through the bottom valve, closing by annulus gas pressure the top valve (808); opening a second valve disposed between the top and bottom valves to also enable flow of the second fluid from the annulus through the second valve and into the tubing, the opening responsive to a change in temperature of the second valve (810); responsive to a decrease in annulus pressure with the flow of the second fluid through the second and bottom valves, closing the bottom valve and passing the second fluid through the second valve (812); and opening a safety valve of the tubing to draw the third fluid and second fluid mixture past the safety valve (814).

The flow diagrams herein provide examples of the unloading operations in a gas-lift oil well 100 using an embodiment of a thermally-actuated gas lift safety valve 200. For instance, one or more of the steps in FIG. 8 may be prompted by, or implemented by, a remotely-located or local control system comprising a processor implementing software logic on a computing device (e.g., such as a computer device, or controller device, or a combination of plural devices). In some embodiments, control of one or more steps of the process 800 may be implemented, at least in part, by hardware, or a combination of hardware and software. Alternate implementations are also included within the scope of the disclosure. In these alternate implementations, steps may be executed out of order from that shown or discussed, including substantially concurrently or in reverse order, depending on the functionality involved.

The foregoing description of illustrated embodiments of the present disclosure, including what is described in the abstract, is not intended to be exhaustive or to limit the disclosure to the precise forms disclosed herein. While specific embodiments of, and examples for, the disclosure are described herein for illustrative purposes only, various equivalent modifications are possible within the spirit and scope of the present disclosure, as those skilled in the relevant art will recognize and appreciate. As indicated, these modifications may be made to the present disclosure in light of the foregoing description of illustrated embodiments.

Thus, while the present disclosure has been described herein with reference to particular embodiments thereof, a latitude of modification, various changes and substitutions are intended in the foregoing disclosures, and it will be appreciated that in some instances some features of embodiments of the disclosure will be employed without a corresponding use of other features without departing from the scope of the disclosure. Therefore, many modifications may be made to adapt a particular situation or material to the essential scope of the present disclosure. It is intended that the disclosure not be limited to the particular terms used in following claims and/or to the particular embodiment disclosed as the best mode contemplated for carrying out this disclosure, but that the disclosure will include any and all embodiments and equivalents falling within the scope of the appended claims.

What is claimed is:

1. A valve, comprising:
   a valve body;
   an orifice disposed within the valve body;
   a fluid flow restraining member located at a first location of the orifice, the fluid flow restraining member pivotable between a closed position and an open position;
   a bellows valve located between an inlet of the valve body and the fluid flow restraining member;
   an extending member connected to, and moveable in pivotable synchronization with, the fluid flow restraining member; and
   a shape memory alloy element attached to the extending member and a portion of the valve body, the shape memory alloy element causing a pivotal movement of the extending member between positions corresponding to the open and closed positions responsive to a change in temperature of the shape memory alloy element.

2. The valve of claim 1, further comprising a force-assist member coupled to the extending member, the force-assist member configured to work in cooperation with the shape memory alloy element in assisting the pivotal movement.

3. The valve of claim 2, wherein the force-assist member comprises a torsion spring.

4. The valve of claim 1, further comprising a stopper element coupled to the extending member, the stopper element restricting the pivotal movement of the extending member to a pivot range of the fluid flow restraining member between the open and closed position.

5. The valve of claim 1, further comprising bearings at one end of the extending member.

6. The valve of claim 1, further comprising one or more additional shape memory alloy elements attached to the extending member.

7. The valve of claim 1, wherein the orifice comprises at least in part a venturi tube.

8. The valve of claim 1, further comprising a check valve located proximal to a second location of the orifice.

9. The valve of claim 1, wherein the fluid flow restraining member comprises a ball valve.

10. The valve of claim 1, further comprising a sealing member flush with at least a portion of the fluid flow restraining member.

11. A valve, comprising:
    a valve body;
    an orifice disposed within the valve body;
    a fluid flow restraining member located at a first location of the orifice, the fluid flow restraining member pivotable between a closed position and an open position;
    plural extending members connected to opposing sides of the fluid flow restraining member, the extending members moveable in pivotable synchronization with the fluid flow restraining member;
    a first shape memory alloy element attached to a first of the plural extending members and the valve body; and
    a second shape memory allow element attached to a second of the plural extending members and the valve body, the first and second shape memory alloy elements causing a pivotal movement of the first and second extending members between positions corresponding to the open and closed positions responsive to a change in temperature of the first and second shape memory alloy elements.

12. The valve of claim 11, further comprising first and second force-assist members radially wound along at least a portion of the first and second extending members, respectively, the first and second force-assist members configured to work in cooperation with the first and second shape memory alloy elements in assisting the pivotal movement.

13. The valve of claim 12, wherein the first and second force-assist members each comprise torsion springs.

14. The valve of claim 11, further comprising: a check valve located proximal to a second location of the orifice; and a bellows valve located between an inlet of the valve body and the fluid flow restraining member.

15. The valve of claim 11, wherein the fluid flow restraining member comprises a ball valve.

* * * * *